United States Patent

Malcolm

[15] 3,691,479

[45] Sept. 12, 1972

[54] MULTI-DIODE SINGLE CAVITY MICROWAVE OSCILLATORS

[72] Inventor: Bruce G. Malcolm, 38 Arunde Place, Clayton, Mo. 63105

[22] Filed: Aug. 24, 1970

[21] Appl. No.: 65,910

[52] U.S. Cl...............................331/107 G, 331/96

[51] Int. Cl...............................H03b 7/06

[58] Field of Search..............................331/107, 56, 96

[56] References Cited

UNITED STATES PATENTS

| | | | |
|---|---|---|---|
| 3,491,310 | 1/1970 | Hines | 331/107 |
| 3,465,265 | 9/1969 | Kuru | 331/107 |
| 3,231,831 | 1/1966 | Hines | 331/96 |
| 3,252,112 | 5/1966 | Haver | 331/56 |
| 3,452,305 | 6/1969 | Hefni | 331/96 |
| 3,524,149 | 8/1970 | Socci | 331/96 |
| 3,568,110 | 3/1971 | Ivanek | 331/96 |
| 3,571,750 | 3/1971 | Carlson | 331/96 |

OTHER PUBLICATIONS

K. Wilson, Mullard Tech. Comm. No. 100, page 289 July 1969 " Gunn Effect Devices" K. Wilson

*Primary Examiner*—John Kominski
*Attorney*—Rosen & Steinhilper

[57] ABSTRACT

The disclosure herein relates to single-cavity microwave oscillators in general, and multi-diode single cavity microwave oscillators in particular. The disclosure further relates to methods for combining the microwave power of a plurality of bulk negative resistance diodes in a single resonant cavity, for electronically and mechanically tuning oscillator circuits, for frequency-temperature compensation of the oscillator, and for obtaining low frequency modulated noise from the oscillator.

7 Claims, 10 Drawing Figures

INVENTOR
BRUCE G. MALCOLM
BY
William I. Andress
ATTORNEY

INVENTOR
BRUCE G. MALCOLM

BY William I. Andress
ATTORNEY

INVENTOR
BRUCE G. MALCOLM
BY William I. Andress
ATTORNEY

INVENTOR
BRUCE G. MALCOLM
BY William I. Andress
ATTORNEY

MULTI-DIODE SINGLE CAVITY MICROWAVE OSCILLATORS

BACKGROUND OF THE INVENTION

This invention pertains to the field of solid-state microwave cavity oscillators having bulk negative resistance microwave diodes mounted in a resonant cavity.

Microwave oscillators using negative resistance diodes are well known to the prior art. Typically, a basic structure for known microwave oscillators includes a single rectangular resonant cavity containing a single power diode mounted at one end on a post with the other end touching the opposite wall of the cavity or a screw, used for mechanical tuning of the circuit. Modifications of this basic structure include the addition of a varactor diode to provide electronic tuning and mounted in the resonant cavity similarly as the power diode, or butted end to end therewith.

Another microwave oscillator structure described in the art (U.S. Pat. No. 3,510,800) involves a combined resonator arrangement having two cavities, in one of which a single negative resistance element is mounted; this cavity is connected to a second cavity via an iris. The first cavity is tunable to a first resonant frequency of a fundamental component field localized therein, and coupled to the second cavity which is tunable to a second resonant frequency of a higher harmonic component field of the first resonant frequency; the higher harmonic component field being distributed and resonated in both cavities. Either component generated in the two-cavity resonator may be derived therefrom via a third (filtering) cavity and output window as the output frequency.

Still another microwave oscillator structure is exemplified in U.S. Pat. No. 3,521,194. This patent describes a circular coaxial oscillator, having the appearance of a coaxial magnetron, wherein a plurality of individual half-wave or quarter-wave tunnel diode oscillator cavities, each containing a single tunnel diode, are coupled together via slots in each cavity opening into a common main cavity which is made to operate in the $TE_{011}$ mode and tuned with a tuning ring. Each tunnel diode is individually biased to oscillate independently in its own cavity. By maintaining the current circulating around the center post of the main coaxial cavity constant in both phase and amplitude, the individual cavities are operationally locked together in phase synchronism.

In addition to the resonant cavity-power diode structural relationship exemplified above, reference is also made to use of various Q values in resonant cavities. The use of a high Q cavity containing a bulk negative resistance diode is well known. High Q circuits in microwave oscillators are known to reduce noise of the oscillating output and to stabilize the oscillation frequency against changes in the power source or load. Exemplary oscillator structures in which use is made of high Q circuits include those having single resonant cavities containing a single power diode and which operate in the $TE_{101}$ rectangular waveguide mode. Another oscillator structure is characterized by a two-cavity arrangement wherein the power diode is mounted in a low Q cavity coupled to a high Q cavity, which serves to stabilize the oscillation and filter the output power. Three-cavity structures are exemplified by the oscillators shown in U.S. Pat. No. 3,510,800 referred to above. In addition to oscillator structures using high Q circuits and having an over-all generally rectangular configuration, other oscillator structures having an over-all circular configuration are known; such structures are exemplified by the multiple tunnel diode coaxial oscillator device described in U.S. Pat. No. 3,521,194 referred to above. Still other oscillator structures utilizing high Q circuits are exemplified by commercially available oscillators containing a power diode and a varactor diode for electronic tuning, mounted in the resonant cavity. Some work reportedly has been done on fabricating a multi-Gunn-effect diode amplifier using a $TM_{01}$ right circular cavity, but the results of such work are unknown to the inventor herein.

Microwave oscillators utilizing low Q circuits in a variety of configurations are well known. Both single cavity and plural cavity oscillators having at least one low Q circuit containing the power diode are exemplified by certain of the oscillators described above. One shortcoming of oscillator circuits utilizing only low Q cavities is that these circuits cannot provide very low FM noise performance.

One problem affecting the constancy of output frequencies in microwave oscillators is the variation in frequency with variation in temperature. Among the various methods devised for frequency-temperature compensation might be mentioned a method described in U.S. Pat. No. 3,523,258. According to this method a linearizing circuit comprising a plurality of resistors, including thermistors, is connected to an oscillator to apply a varying voltage to a varactor diode which provides a voltage-varying capacitance which forms a part of the load. Changes in temperature cause frequency shifts in the oscillator crystal and in the resistance of the thermistors, thereby changing the voltage applied to the varactor diode. This circuit is designed to change its resistance and the resulting voltage applied to the varactor diode in proportion with the temperature-induced change in frequency of the crystal and maintain a constant frequency output. Various other methods are known for compensating a crystal controlled oscillator to operate over a wide temperature range with limited variance in the resonant frequency.

SUMMARY OF THE INVENTION

The present invention relates to high power continuous wave (CW) solid-state microwave oscillators having a plurality of bulk negative resistance microwave diodes positioned in a single resonant cavity.

The CW oscillators of this invention are characterized by the following structural and functional features:

1. A plurality of at least three diodes exhibiting negative resistance characteristics at microwave frequencies positioned in the sole resonant cavity of an oscillator circuit, preferably a $TE_{101}$ rectangular cavity.

2. The said diodes are located within the cavity at positions of equivalent R.F. impedance.

3. The resonant cavity is operated with a very high loaded Q, (E.G., $\approx$1,000) hence, high R.F. fields and energy storage and low FM noise, voltage frequency pushing (change in frequency as a function of power diode bias), and pulling figure (change in frequency as a function of phase and/or magnitude of a mismatched R.F. load).

4. The power produced by each of said diodes is phase-locked to the R.F. fields of the resonant circuit by virtue of the high loaded Q and high energy storage of the resonant circuit.

5. Said diodes are all in parallel with respect to the D.C. bias supply, thus obviating the need to exactly match the D.C. characteristics of the diodes at any time before, during or after threshold of oscillation.

6. Said diodes are in the particular series-parallel combination with respect to the R.F. electric field in the circuit as to provide for the maximum number of diodes to be mounted in the resonant cavity in parallel with respect to the D.C. bias supply, at positions of equivalent R.F. impedance and phase-locking of equal units of power contributed by the several diodes.

7. Mechanical tuning of the oscillator circuit by means of a vernier.

8. Automatic temperature frequency compensation (maintaining nearly constant frequency with changes in temperature) by the use of metals of different thermal expansion coefficients in the mechanical tuner assembly.

9. Electronic tuning of the oscillator circuit by means of a varactor diode which may be (a) substituted for one of said diodes exhibiting negative resistance, or (b) mounted externally of the resonant circuit, but coupled thereto by means of a probe to the R.F. electric field or loop to the R.F. magnetic field.

The salient advantages provided by the microwave oscillator of the present invention are:

1. The provision of an oscillator having but one cavity resonator containing a plurality of negative resistance diodes whose individual output powers are synchronized to multiply the total power output of the device.

2. The utilization of a very high loaded Q, hence, high energy storage in the single resonant cavity containing a plurality of said diodes positioned at sites of equivalent R.F. impedance.

3. A substantially constant frequency or power output, in spite of fluctuations in D.C. bias voltage or current, or R.F. load, by virtue of negligible diode reactance contribution to the total reactance in the high Q circuit. In contrast, the oscillator described in U.S. Pat. No. 3,510,800 referred to above requires an interaction within a dual-cavity resonator, between a fundamental component field of oscillation, a high harmonic field component and a negative resistance element to achieve frequency stabilization.

4. Frequency changes due to temperature changes are automatically compensated by the combined use of materials which expand and contract linearly with temperature changes by simple mechanical action, effecting tuning. A prior-art technique for achieving this form of frequency-temperature compensation is described in "Technique of Microwave Measurements" — Montgomery — Vol. II — Radiation Laboratory Series; McGraw-Hill Book Company, Inc., 1947, Section 6.25, pages 386–390, entitled "External Temperature Compensation." This may be contrasted with the method for effecting frequency temperature compensation by use of a linearizing circuit comprising a plurality of resistors, including thermistors, described in U.S. Pat. No. 3,523,258 referred to above.

5. Wide band mechanical tuning with small effect on the actual impedance at the diode and consequently small power variations over the mechanical tuning range.

6. Electronic tuning by use of a varactor diode which can be utilized internally or externally of the resonant cavity.

7. Extremely low F.M. noise.

8. Adaptability of the multi-diode single-cavity oscillator of this invention to diverse utilities requiring any specific type of diode exhibiting negative resistance characteristics at microwave frequencies, e.g., Gunn-effect, avalanche transit time (ATT), or tunnel.

It is, therefore, an object of this invention to provide a multi-diode single resonant cavity microwave oscillator characterized by the foregoing structural and functional features and providing the advantages enumerated above.

BRIEF DESCRIPTION OF THE DRAWINGS

The accompanying drawings illustrate embodiments of the invention.

DESCRIPTION OF THE PREFERRED EMBODIMENT

A preferred embodiment of this invention will be described with reference to a mechanically and electronically tunable high-power microwave oscillator containing three Gunn-effect diodes and one varactor diode mounted inside the single $TE_{101}$ rectangular resonant cavity of the oscillator.

Figure 1:
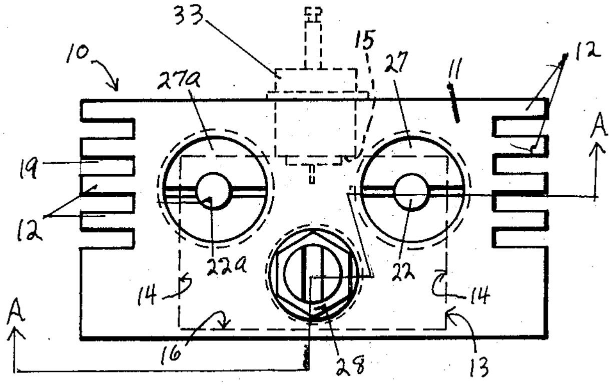
FIG. 1 is a schematic top plan view of a multi-diode single-cavity microwave oscillator according to the invention.
Figure 2:
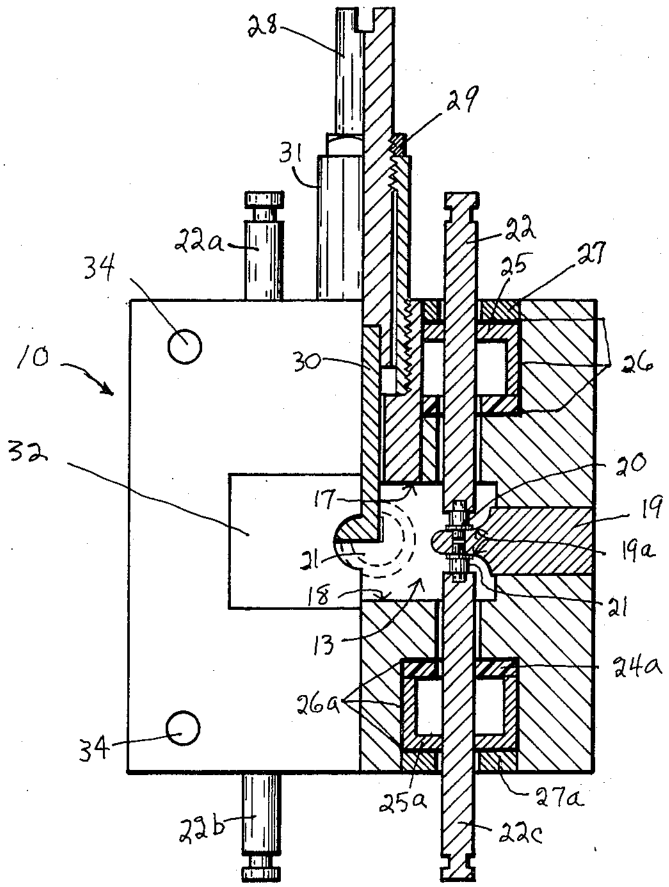
FIG. 2 is a schematic partial sectional front view of the oscillator shown in FIG. 1 taken along line A—A.

Referring to the drawings, the oscillator 10 of this embodiment is shown schematically in top plan view in FIG. 1 and in partial sectional front right side view in FIG. 2, taken along line A—A of FIG. 1. The oscillator housing 11 is of generally rectangular configuration having cooling fins 12 running vertically from top to bottom along the outer sides or ends as shown in FIG. 1. The housing is made of aluminum or other metal having a high thermal coefficient of expansion, e.g., copper and brass. The resonant cavity 13 of the circuit is located internally in a central portion of the oscillator housing and is bounded by lateral side walls 14, and longitudinally disposed back wall 15, front wall 16, top wall 17 and bottom wall 18. The side front and back walls of the cavity are generally more narrow than the top and bottom walls of the cavity. The cavity is plated with a material, e.g., silver (not shown in the figures) having minimal electrical resistance.

The three Gunn-effect diodes and the varactor diode used in the oscillator of this embodiment are mounted in the resonant cavity in the following manner, having particular reference to FIG. : A copper heat sink and common ground 19 is tightly fitted into a hole provided in the end or side wall of oscillator housing 11 with the inside end of the heat sink protruding into cavity 13. The heat sink is solder-fitted into the housing. Thermal spreading resistance between the power diodes and body of the oscillator is minimized by use of the copper heat sink thus fitted into the oscillator body. The end of the heat sink protruding into the resonant cavity has a necked-down flatted portion **19*a* with a hole running vertically therethrough and of a diameter large enough in which to seat Gunn-effect diode 20 and varactor diode 21 at their heat sink ends; the ends of the diodes are spaced apart by about 10 mils. The input ends of Gunn-effect diode 20 and varactor diode 21 are attached to input bias terminals 22 and 22*c*respectively, by insertion into a recess in said bias terminals. The said bias terminals are affixed, respectively, to the oscillator body by means of a feed-through assembly comprising feed-through washers 24 and 24*a*, bushings 25 and 25*a*, electrical insulation 26 and 26*a* and bias feed-through lock nuts 27 and 27*a*. While the foregoing description of mounting the Gunn-effect diode 20 in the cavity by means of heat sink 19 and the feed-through structure for the Gunn-effect diode bias terminals was made with particular reference to the heat sink and bias terminal 22 shown in section, it will be understood that the same procedure is used for mounting the other two Gunn-effect diodes (not shown) associated with bias terminals 22*a* and 22*b*** in the resonant cavity.

Electrically, the feed-through structure comprises a one-fourth wavelength low-impedance coaxial line (moving out from the cavity) followed by a one-fourth wavelength higher impedance coaxial line terminated by a short; the whole of which is insulated from the feed-through housing which is machined into the body of the oscillator. The point of D.C. break is made between the high impedance and low impedance coaxial sections at an RF open circuit and is one-half wavelength from the quasi-open circuit where the feed-through bias terminal enters the feed-through housing.

The mechanical frequency-temperature compensating tuning assembly is affixed to the oscillator body in the following manner: an adjustable compensating mechanical tuner holder 28 is fitted with lock-nut 29 on an upper threaded portion of the tuner holder. A dielectric tuning rod 30 is inserted into a recessed hole in a lower section of the tuner holder and attached thereto, suitably by epoxy bonding. Thus fitted, the tuner holder is attached to a compensating tuner housing 31 and the whole assembly is then attached to the oscillator body suitably by screwing the housing 31 into threads provided in the oscillator cavity body 10. Thereafter, an iris plate 32 is inserted into grooves (not shown) in the body of the oscillator, defining the front periphery of the cavity and soldered in place.

With respect to the tuner holder, the material used should be of low thermal expansion coefficient, e.g., a nickel/iron alloy. The tuning rod should be a dielectric material, e.g., ceramics, also having a low thermal expansion coefficient. On the other hand, the compensating tuner housing and oscillator body should be constructed of materials having a high thermal expansion coefficient, e.g., aluminum, copper, brass or other metals.

The iris plate is typically 0.030 inch thick and 0.25 inch in diameter. An alternative arrangement is to form the iris into the body of the oscillator, e.g., by machining or casting. The iris dimensions may be varied to vary certain performance characteristics such as power output, pulling factor, electronic tuning, range and noise.

With further respect to the location of the Gunn-effect diodes in the rectangular cavity of the oscillator, the heat sink 19 and bias feed-through terminal means 22, **22*a* and 22*b*** for mounting the diodes in the cavity are so positioned that the diodes are symetrically located with respect to being equal distances from the side and back walls, and equal distances from the top and bottom walls of the cavity. A feature of the selected positions for the power diodes is their location at sites of equivalent R.F. impedance. The in-phase power combining of the several diodes wherein each diode contributes an equal unit of power, which is the result of their aforesaid location, and the microwave resonant circuit which has a very high loaded Q (on the order of 1,000), hence high R.F. fields and energy storage which phase locks the power produced by each diode to the R.F. fields of the resonant circuit. The diodes are in parallel with respect to the D.C. bias supply which obviates the need to exactly match the D.C. characteristics of the diodes either before, during or after threshold oscillation. Further, the diodes are in the particular series-parallel combination with respect to the R.F. field in the circuit which allows the maximum number of diodes to be mounted to achieve the features and advantages mentioned herein.

In this particular embodiment, three Gunn-effect diodes associated with power diode bias terminals 22, **22*a* and 22*b* are wired in parallel to a voltage supply. As noted above, the varactor diode of FIG. 2** is mounted internally of the resonant cavity; this diode may be replaced with a fourth Gunn-effect diode where electronic tuning may not be desired or required.

Figure 3:
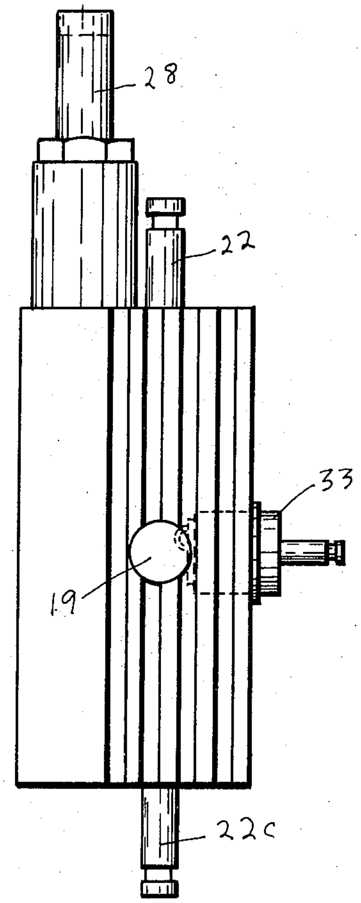
FIG. 3 is a schematic side elevation view in partial section showing an oscillator according to this invention having a varactor tuning element coupled to the resonant cavity.
Figure 4:
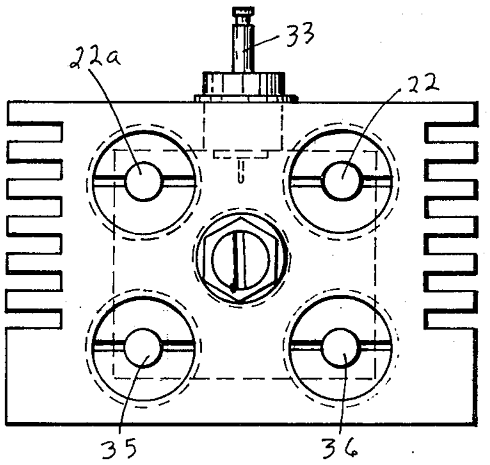
FIG. 4 is a top plan schematic view of a microwave oscillator having eight power diodes.

A further embodiment of the invention herein is shown in FIGS. 1, 3 and 4 where an electronic tuning varactor diode package 33 is mounted externally of the resonant cavity, but coupled thereto by means of a probe to the R.F. electric field or a loop to the R.F. magnetic field. FIG. 1 shows this embodiment in optional form (dotted lines) in top plan view; FIG. 3 illustrates this embodiment from a side (end) view. As will be noted in this embodiment, and partially shown in FIGS. 1 and 3, there are four Gunn-effect diodes mounted internally of the resonant cavity with a probe or loop (i.e., a coupling member) of the externally mounted varactor protruding or extending into the cavity. In the microwave oscillator depicted in FIG. 4, eight Gunn-effect diodes are mounted inside the resonant cavity according to the criteria and in the manner for locating the power diodes described above; in this case, of course, a heat sink is used for each pair of power diodes which, again, are wired in parallel.

The multi-diode single-cavity microwave oscillator of this invention has been described above in various structural embodiments and modification. The operation of a typical oscillator herein having three power diodes and a varactor diode situated in the resonant cavity will now be described. As used herein the varactor voltage is to be construed as negative.

Figure 5:
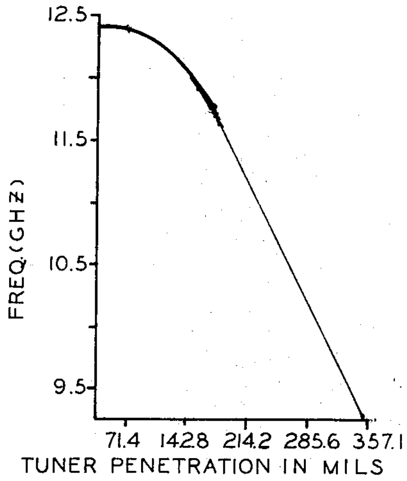
In FIG. 5 is shown a tuning curve with frequency plotted against tuner penetration into the resonant cavity.
Figure 10:
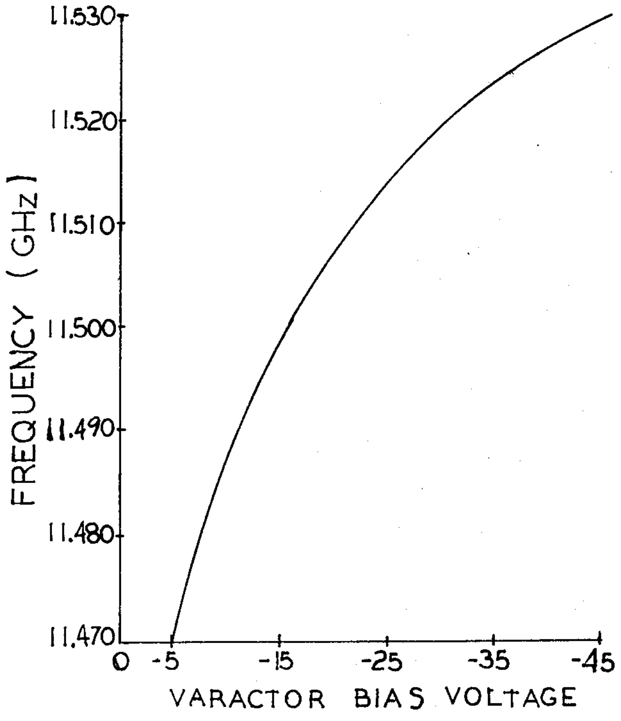
FIG. 10 is a graph showing frequency plotted against varactor bias voltage showing a tuning characteristic curve.
Figure 8:
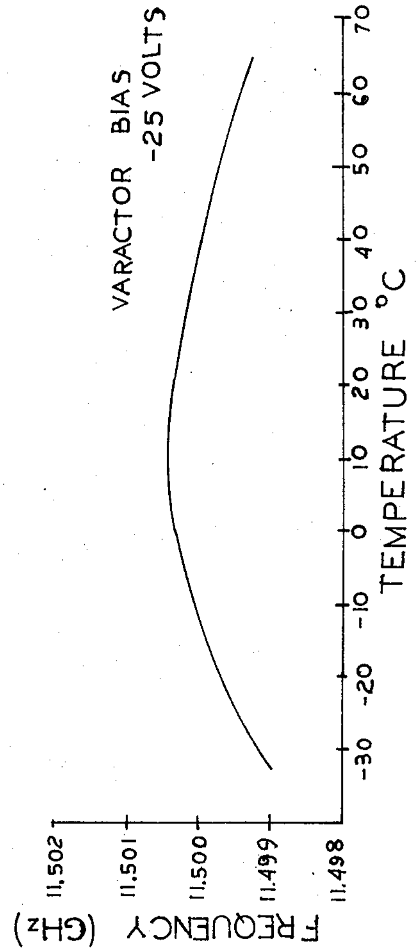
In FIG. 8 is shown a typical frequency-temperature coefficient curve with frequency plotted against temperature at a constant varactor voltage.
Figure 9:
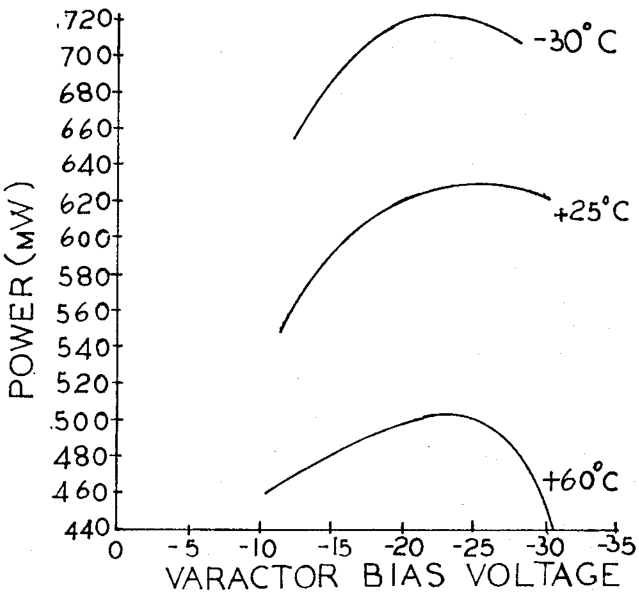
In FIG. 9 is shown a family of curves with power output plotted against varactor bias voltage at different temperatures.

In operation, the oscillator is attached via mounting holes 34, as shown in FIG. 2, to an appropriate R.F. load, e.g., a telecommunications transmitter where the load is ultimately an antenna which radiates into free space. A common D.C. bias voltage, typically 10 volts (at 2.5 amps) is applied to the feedthrough terminals at the Gunn-effect diode positions causing each of the diodes to produce microwave power at X-band which is combined in the high Q cavity and part of which is delivered through the iris to the R.F. load. The power output is typically over 0.6 watts CW. Frequency modulation or electronic tuning is accomplished over a 60 MHZ range as shown in FIG. 10 by modulating or adjusting a voltage (typically (—)5 to (—)45 volts) applied to the varactor bias terminal. The varactor is a solid-state diode which changes capacitance as a function of reverse bias voltage until avalanche breakdown is reached, typically at —50 volts for varactor diodes appropriate to the oscillator of this embodiment. The power output is relatively constant as a function of varactor bias voltage as shown in the curves of FIG. 9. Mechanical tuning of the output frequency is accomplished by rotation of the mechanical tuner holder which is threaded with the compensating tuner housing. Linear mechanical tuning of over 2 GHz is typical as shown in FIG. 5. Automatic frequency-temperature compensation is accomplished by the action of dissimilar expansion coefficient metals in the tuner structure which are designed to withdraw the tuner with increasing temperature at a rate that causes a frequency change that just balances the opposite frequency change caused by an increase in volume of the resonant cavity due to expansion of oscillator body and tuner housing (see "Technique of Microwave Measurements"—cited above—Section 6.24 and 6.25) with increasing temperature. Typically the frequency temperature coefficient is $2 \times 10^{-6}$ parts/°C. A typical curve is shown in FIG. 8.

Figures 6, 7:
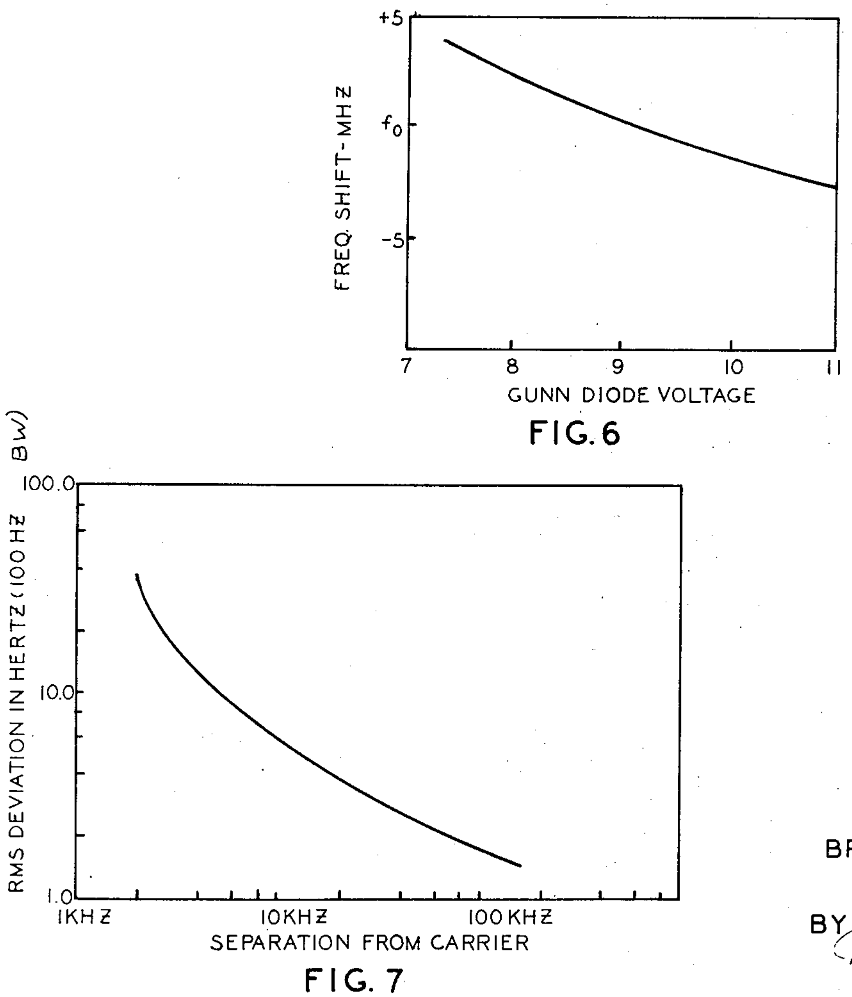
In FIG. 6 is shown a voltage pushing curve with frequency plotted against Gunn-effect diode bias voltage.
In FIG. 7 is shown a typical noise curve with the RMS frequency deviation in a 100 Hz bandwidth plotted against the separation in frequency from the carrier; the sum of both sidebands is shown.

Changes in output frequency as a result of a variation in the Gunn-effect diodes' bias voltage demonstrate a voltage pushing figure of about 3 MHz/volt as shown in FIG. 6. The frequency pulling figure is 5 MHz with a 1.5 : 1 VSWR, all phases of the mismatch.

The FM noise of the output signal is 2.5 Hz RMS in a 100 Hz band-width (BW) 70 KHz from the carrier as shown in FIG. 7.

The high power solid-state microwave oscillator of this invention is of significant utility as a microwave power source having application as a telecommunications transmitter oscillator by virtue of its high output power, low FM noise, frequency temperature stability and frequency modulation capability.

In one utility, e.g., extended range CW Doppler radar, operable from 5 to 15 miles, the oscillator of this invention would employ avalanche transit time diodes instead of Gunn-effect diodes for a four-fold increase in power.

In another utility, where low voltage battery operation is a requirement, tunnel diodes would be combined in the resonant cavity of the instant oscillator to increase the power output over that of a single diode oscillator and due to the parallel D.C. biasing scheme the bias voltage would be on the order of 1.5 volts.

Various modifications of this invention will occur to those skilled in the art without departing from the spirit and scope thereof.

I claim:

1. A high power low F.M. noise multi-diode single resonant cavity microwave oscillator comprising:

a. An oscillator body containing a single high Q resonant $TE_{101}$ rectangular cavity having a top wide wall and an opposed bottom wide wall, first and second narrow side walls, an end wall closing one end of the cavity, and an iris member in the other end of the cavity for therethrough coupling the cavity to a load;

b. a plurality of diodes exhibiting negative resistance at microwave frequencies and located in pairs in at least two positions of equivalent R.F. impedance between said top and bottom walls, each of said positions being located the same distance from said end wall and like distances between one or the other, respectively, of said side walls and the centerline between said side walls;

c. means to mount the members of each pair of said diodes in a symmetrically opposed configuration one on either side, respectively, of the median between said top and bottom wide walls, said mounting means including a rigid grounding member affixed to a side wall and extending into said cavity along said median into each of said locations and providing a pair of opposed supports for receiving and supporting at each support one of the electrodes of each member of the pair of diodes at that location;

d. means extending through said top and bottom walls for supplying D.C. bias voltage in parallel to all of said diodes via the remaining electrodes thereof; and e. means for extracting R.F. energy from said cavity through said iris member.

2. An oscillator according to claim 1 in which one diode of one of said pairs is a voltage-variable impedance device for electronically tuning said oscillator.

3. In combination in an oscillator according to claim 1 means for mechancially tuning said oscillator, said tuning means having operator means external to said cavity and a tuning member within said cavity, and including in said operator means thermo-mechanical means for compensating said tuning member with respect to temperature.

4. Oscillator according to claim 1 having at least four of said positions symmetrically arranged in said cavity, means at each of said positions to mount a pair of said diodes in a symmetrical configuration one on either side, respectively, of the median between said end walls, and means to supply D.C. bias voltage in parallel to all of said diodes.

5. Oscillator according to claim 1 further including means for electronic tuning of said cavity.

6. Oscillator according to claim 5 wherein said electronic tuning means is a varactor diode.

7. Oscillator according to claim 6 wherein said varactor diode is mounted externally of said resonant cavity and coupled thereto by means of a coupling member extending into said cavity.

* * * * *